United States Patent
Jayakumar et al.

(10) Patent No.: US 10,248,798 B1
(45) Date of Patent: Apr. 2, 2019

(54) METHOD AND SYSTEM FOR A CONFIDENTIAL SCAN OF A DOCUMENT

(71) Applicant: TOSHIBA TEC KABUSHIKI KAISHA, Shinagawa-ku, Tokyo (JP)

(72) Inventors: Veena Jayakumar, Karnataka (IN); Anjana Srinivas Pattanagere Srinivas, Karnataka (IN); Saiprasad Kagatikar, Karnataka (IN)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/979,878

(22) Filed: May 15, 2018

(30) Foreign Application Priority Data

Dec. 13, 2017 (IN) .............................. 201741044752

(51) Int. Cl.
| H04N 1/04 | (2006.01) |
| G06F 21/60 | (2013.01) |
| H04N 1/00 | (2006.01) |
| G06F 21/62 | (2013.01) |
| G06F 21/31 | (2013.01) |

(52) U.S. Cl.
CPC ............ *G06F 21/608* (2013.01); *G06F 21/31* (2013.01); *G06F 21/6218* (2013.01); *H04N 1/00326* (2013.01); *H04N 1/00514* (2013.01); *H04N 1/04* (2013.01)

(58) Field of Classification Search
CPC ... H04N 1/00326; H04N 1/00514; H04N 1/04
USPC ....................................................... 358/1.14
See application file for complete search history.

(56) References Cited

U.S. PATENT DOCUMENTS

| 8,943,553 B2 | 1/2015 | Torigoshi et al. | |
| 2006/0221407 A1* | 10/2006 | Uchida ............. | H04N 1/00222 358/448 |
| 2013/0222836 A1* | 8/2013 | Kakegawa ............. | G06F 21/55 358/1.14 |
| 2014/0198335 A1* | 7/2014 | Atmakur ............ | G06K 15/4095 358/1.14 |

* cited by examiner

*Primary Examiner* — Houshang Safaipour
(74) *Attorney, Agent, or Firm* — Foley & Lardner LLP

(57) ABSTRACT

A system and method for performing confidential scanning of a document are provided. Initially, a request from user for a confidential scan of a document through a scanner device associated with the confidential scan system may be received. Further, a first credential may be received from the user. The user may be authenticated based on the first credential data. Upon the authentication, the document may be stored as a hidden document in a predefined path for the confidential scan of the document.

20 Claims, 11 Drawing Sheets

600e

CONFIDENTIAL DOCUMENTS [SETTINGS] [TEMPLATE]   ?— □ ×

| DOCUMENT NAME | DATE/TIME | NO. OF PAGES |
|---|---|---|
| DOC021017 | 02-01-2016/14:38 | 10 |
| DOC031487 | 02-02-2017/12:10 | 54 |
|  |  |  |
|  |  |  |

[SELECT] [JOB STATUS] [SCAN SETTINGS]

DOCUMENT TASKS [SETTINGS] [TEMPLATE]   ?— □ ×

| OPEN | COPY | DELETE |
|---|---|---|
| EDIT | COLOUR PRINT | PUBLISH |
| CUT AND PASTE | PRINT | VIEW DOCUMENTS |

[BACK] [JOB STATUS] [SCAN SETTINGS]

Figure 6f

METHOD AND SYSTEM FOR A CONFIDENTIAL SCAN OF A DOCUMENT

CROSS REFERENCE TO RELATED APPLICATIONS

This application is based upon and claims the benefit of priority from Indian Patent Application No. 201741044752, filed Dec. 13, 2017, the entire contents of which are incorporated herein by reference.

TECHNICAL FIELD

The present subject matter is related in general to the field of scanning of a document, more particularly, but not exclusively to, a system and method for confidential scanning of a document in a scanner device.

BACKGROUND

Scanner devices are configured to scan a document provided by a user. Upon the scan, the document may be stored in a storage unit associated with the scanner device. The storage unit may be embedded inside the scanner device or may be an external module connected to the scanner device. A scanner device may be associated with a generic account. Using the generic account, operations relating to the scanner device may be performed. Further, using the generic account, the scanner device may be accessible to any user who wishes to perform the operations on a document. When a user selects to scan the document using the scanner device, the scanner device scans the document and stores in the storage unit, with the generic account. Since the scanned document is stored with the generic account, the scanned document may be accessible to any user associated with the scanner device. There may not be any restrictions on performing the operations on the scanned document.

One or more techniques may be implemented in provisioning restrictions to the scanned documents. The techniques may include password protecting the document which is scanned. However, the scanned document may be still viewed by any user, using the generic account. The user may be restricted for editing the scanned document, but the user may delete or copy the scanned document, even without the password. Such techniques do not provide complete confidentiality in scanning.

Confidentiality may be provisioned by storing the scanned document in an authenticated storage space. The authentication of the storage space may be done using credential data. Such techniques establish need for partition in storage areas where confidentially scanned documents and non-confidentially scanned documents are separately stored. With restrictions in terms of storage space for the scanned documents, there may be storage related issues in such techniques. Further, irrespective of a user associated with the confidentially scanned document, any person aware of the credential data may get access to all the confidentially scanned documents. By this, complete security to protect confidentiality of the confidentially scanned documents may not be achieved.

The information disclosed in this background of the disclosure section is only for enhancement of understanding of the general background and should not be taken as an acknowledgement or any form of suggestion that this information forms the prior art already known to a person skilled in the art.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIGS. 6a-6f illustrate exemplary representations of a display associated with a scanner device for performing confidential scanning of a document in accordance with some embodiments of present disclosure.

Figure 1A:
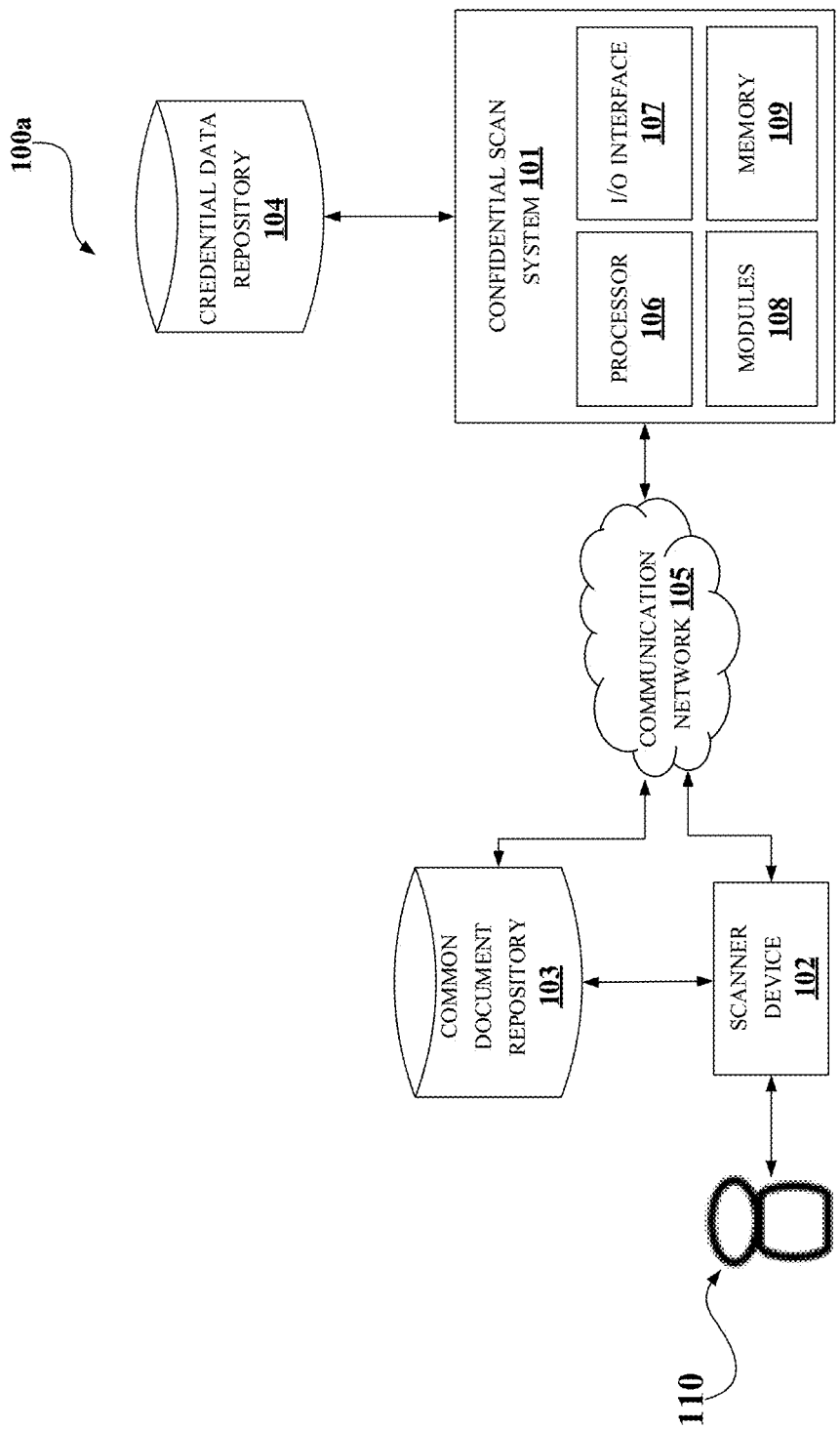
FIG. 1a illustrates an exemplary environment for performing confidential scanning of a document in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially implemented in one or more computer readable mediums and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a pan hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The description is, therefore, not to be taken in a limiting sense.

Confidential scan of a document in a scanner device, according to one or more embodiments, may be essential for provisioning complete confidentiality for a document by a user. By the confidential scan, security of the confidential scanned document may be achieved by hiding the scanned document from view of unauthenticated user. In the present disclosure, request for the confidential scan and credential data may be received from the user to perform the confidential scan in the scanner device. Authentication of the credential data may be performed and upon the authentication, the scanned document may be stored in a common document repository associated with the scanner device, as a hidden document. By the confidential scan described herein, restrictions to perform tasks on the scanned document may be achieved. The scanned document may also be stored in a path as desired by the user.

In at least one embodiment, the present disclosure relates to a method for confidential scan of a document in a scanner device. For the confidential scan, initially, a request from user for a confidential scan of a document through a scanner device associated with the confidential scan system may be received. Further, a first credential may be received from the user. The user may be authenticated based on the first credential data. Upon the authentication, the document may be stored as a hidden document in a predefined path, for the confidential scan of the document.

In at least one embodiment, the present disclosure relates to a confidential scan system for confidential scan of a document in a scanner device. The confidential scan system comprises a processor and a memory communicatively coupled to the processor. The memory stores processor-executable instructions, which, on execution, cause the processor to perform the confidential scan. For the confidential scan, initially, a request from user for a confidential scan of a document through a scanner device associated with the confidential scan system may be received. Further, a first credential data may be received from the user. The user may be authenticated based on the first credential data. Upon the authentication, the document may be stored as a hidden document in a predefined path, for the confidential scan of the document.

FIG. 1 illustrates an exemplary environment 100a of a confidential scan system 101 for confidential scanning of a document. The exemplary environment 100a comprises the confidential scan system 101, a scanner device 102 communicatively connected to a user 110, a common document repository 103, a credential data repository 104 and a communication network 105. The confidential scan system 101 may be configured to perform the confidential scan of the document.

Figure 1B:
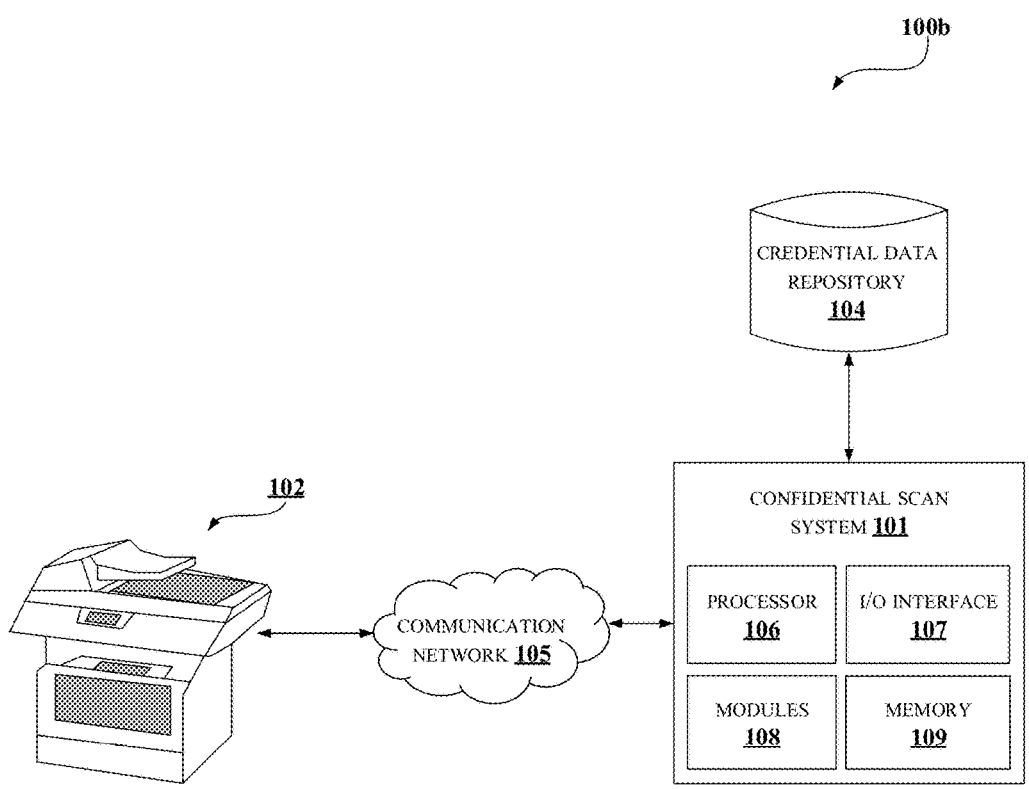
FIG. 1b illustrates an exemplary environment for performing confidential scanning of a document in accordance with some embodiments of the present disclosure.
Figure 1C:
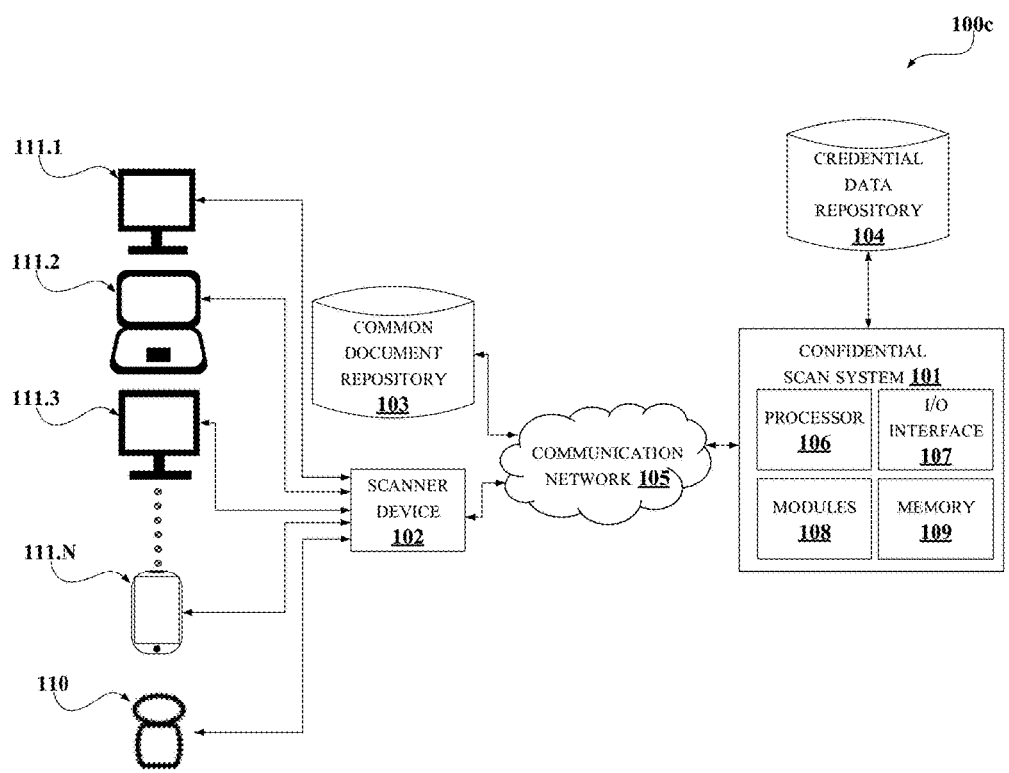
FIG. 1c illustrates an exemplary environment for performing confidential scanning of a document in accordance with some embodiments of the present disclosure.

The scanner device 102 may be any scanning system that may be configured to scan the document that is provided to the scanner device 102. The scanner device 102 may also be referred to as a scanner. In an exemplary environment 100b, as illustrated in FIG. 1b, the scanner device 102 may be a Multi-Functional Printer (MFP) 102 which provisions access to perform one or more operations on the document. The one or more operations may include, but are not limited to, scanning, printing, faxing, colour scanning, colour printing, emailing and so on. The common document repository 103 may be a repository associated with the scanner device 102. One or more documents which are to be scanned by the scanner device 102 may be stored in the common document repository 103. In FIG. 1b, the common document repository 103 may be embedded inside the MFP 102. The scanner device 102 may be associated with a generic account, through which the one or more operations may be performed on the document, by the user 110. In at least one embodiment, multiple users, with the generic account, may be provisioned to perform the one or more operations on the document as shown in FIG. 1c. The multiple users may directly communicate with the scanner device 102 or may communicate with the scanner device 102 via one or more user devices 111.1 . . . 111.N (also referred as user devices 110). The user devices ill may be personal computer, a tablet, a smart book, a smart phone, a personal digital assistant, a palmtop computer, an in-car computer, network server and so on. With the generic account, the one or more documents in the common document repository 103 may be accessible by any of the multiple users. However, by confidential scanning according to one or more embodiments, the document which is scanned may be stored and hidden in the common document repository 103. By the confidential scan, the confidential scanned document may not be accessible to all the multiple users. The confidential scan document may be accessible to a user from the multiple users, the user being a user who has performed the confidential scan only.

The confidential scan system 101 may communicate with the scanner device 102 and the common document repository 103 via a communication network 105. The confidential scan system 101 may communicate with the scanner device 102 for retrieving and providing data which may be used for the confidential scan. The confidential scan system 101 may communicate with the common document repository 103 for retrieving and performing one or more tasks on the scanned document. In at least one embodiment, the confidential scan system 101 may be embedded in the scanner device 102 for performing the confidential scan. In at least one embodiment, the communication network 105 may include, without limitation, a direct interconnection, Local Area Network (LAN), Wide Area Network (WAN), wireless network (e.g., using Wireless Application Protocol), the Internet, and the like.

Further, the confidential system 101 includes a processor 106, an I/O interface 107, one or more modules 108 and a memory 109. In some embodiments, the memory 109 may be communicatively coupled to the processor 106. The memory 109 stores processor executable instructions, which, on execution, may cause the confidential scan system 101 to perform the confidential scan on the document. The confidential scan system 101 may be implemented in a variety of computing systems, such as a laptop computer, a desktop computer, a Personal Computer (PC), a notebook, a smartphone, a tablet, e-book readers, a server, a network server, and the like.

Further, along with details of the generic account associated with the scanner device 102, one or more pre-stored credential data associated with one or more users may be stored in the credential data repository 104 associated with the confidential scan system 101. In at least one embodiment, the credential data repository 104 may be a repository associated with the scanner device 102 (not shown in the figure). In at least one embodiment, the credential data repository 104 may be embedded inside the scanner device 102 as illustrated in FIG. 1b. The confidential scan system 101 may communicate with the credential data repository 104 via the communication network 105. In at least one embodiment, the credential data repository 104 may be embedded inside the confidential scan system 101 (not shown in the figure).

For performing the confidential scan on the document, initially, a request from the user 110 for a confidential scan of a document through the scanner device 102 may be received. In at least one embodiment, the scanner device 102 may provision an option to the user 110 to choose between a normal scan and the confidential scan. By choosing the confidential scan, the request may be generated by the scanner device 102. The request may be communicated to the confidential scan via the communication network 105, to trigger the confidential scan.

Upon receiving the request for the confidential scan, the confidential scan system 101 may be configured to enable the user 110 to provide a first credential data from the user 110. In at least one embodiment the first credential data may comprise at least one of user identification data along with a password. The user identification data may be an email ID, a user name or any identification data that may be unique to the user. The first credential data may be retrieved from the user 110 via the communication network 105.

The user 110 may be authenticated based on the first credential data. For the authentication, the first credential data may be verified to be one of the pre-stored credential data in the credential data repository 104 associated with the scanner device 102 and a new credential data. For the verification, the pre-stored credential data may be retrieved from the credential data repository 104. The confidential scan system 101 checks for the first credential data to be one of the pre-stored credential data. If the first credential data is verified to be the pre-stored credential data, the confidential scan system 101 completes the authentication of the user 110. If the first credential data is not one of the pre-stored credential data, the confidential scan system 101 verifies the first credential data to be the new credential data. Further, when the first credential data is verified to be the new credential data, the first credential data may be updated in the credential data repository 104 as one of the pre-stored credential data to complete the authentication.

In at least one embodiment, the document may be confidentially scanned by the scanner device 102, before the authentication of the first credential data. In another embodiment, the scanner device 102 may confidentially scan the document after the authentication of the first credential data.

Upon the authentication and scanning of the document, the confidential scanned document may be stored in a predefined path as a hidden document. The confidential scan system 101 may enable the user 110 to provide the predefined path via the scanner device 102. The scanner device 102 may retrieve the predefined path and provide the predefined path to the confidential scan system 102 via the communication network 105. In at least one embodiment, the predefined path may be one of a path to the common document repository 103 associated with the scanner device 102 and a path provided by the user 110. In at least one embodiment, the path provided by the user 110 may be a path to an external storage system connected to the scanner device 102. In at least one embodiment, the path provided by the user 110 may be path to a server, a cloud and so on.

Further, the stored document may be stored as the hidden document in the predefined path by which the confidential scanned document may not be visible to any user associated with the scanned document. One or more techniques, known to a person skilled in the art, may be implemented for storing the confidential scan document as the hidden document in the predefined path. In at least one embodiment, by the hiding, the confidentially of the scanned document may be achieved. By hiding, the access to the confidential scanned document may be disabled to a user who may not be authenticated, and authenticated user only may be able to view the confidential scanned document.

In at least one embodiment, the confidential scan system 101 may further be configured to enable the user 110 to view the confidential scanned document which may be stored as the hidden document. For enabling, the confidential scan system 101 may receive a second credential data from the user 110. The confidential scan system 101 may enable the user 110 to provide the second credential data via the scanner device 102. The scanner device 102 may retrieve the second credential data and provide to the confidential scan system 101 via the communication system 105.

Further, a request from the user 110 to view the confidential scanned document may be received by the confidential scan system 101. The user 110 may be provided an option to send the request to view the confidential scanned document through the scanner device 102. Upon receiving the request, the second credential data may be verified to be same as the first credential data. When the second credential data is verified to be the first credential data, the confidential scan system 101 enables the user 110 to view the confidential scanned document associated with the first credential data. By this, the user 110 with the first credential data may only be able to view the confidential scan document. Other users from the multiple users may not be able to view the confidential scanned document. In at least one embodiment, the confidential scanned document may be retrieved from the predefined path for the viewing.

In at least one embodiment, the confidential scan system 101 may provide an access to the user 110 to perform the one or more tasks on the confidential scanned document upon verification. The one or more tasks on the confidential scanned document may include, but are not limited to, modifying, deleting, printing, copying, cutting and pasting and publishing the confidential scanned document. The access to perform the one or more tasks may be provided upon the verification of the second credential data to be the first credential data, by which, the confidentiality of the confidential scanned document may be retained. In at least one embodiment, access to modify the confidential scanned document, may provision the user 110 to edit contents of the confidential scanned document. In at least one embodiment, access to delete may provision the user 110 to delete the confidential scanned document from the predefined path. In at least one embodiment, access to modify the confidential scanned document may provision the user 110 to edit contents of the confidential scanned document. In at least one embodiment, access to print may provision the user 110 to print the contents of the confidential scanned document. In at least one embodiment, access to copy the confidential scanned document may provision the user 110 to copy the confidential scanned document and paste in any other predefined path desired by the user 110. In at least one embodiment, access to cut and paste may provision the user 110 to delete the confidential scanned document in the common document repository 104 and store the confidential scanned document in storage space of a user device associated with the user 110. In at least one embodiment, access to publish may provision the user 110 to disable the hiding of the confidential scanned document in the predefined path. By publishing the confidential scanned document, the confidentiality of the confidential scanned document may be lost, and the document may be accessible and viewed by any user associated with the scanner device 102.

In at least one embodiment, the confidential scan system 101 may receive data for performing the confidential scan through the I/O interface 107 of the confidential scan system 101. Also, the confidential scan system 101 may transmit data for performing the confidential scan via the I/O interface 107. The I/O interface 107 may be coupled with the processor 106 of the confidential scan system 101.

Figure 2:
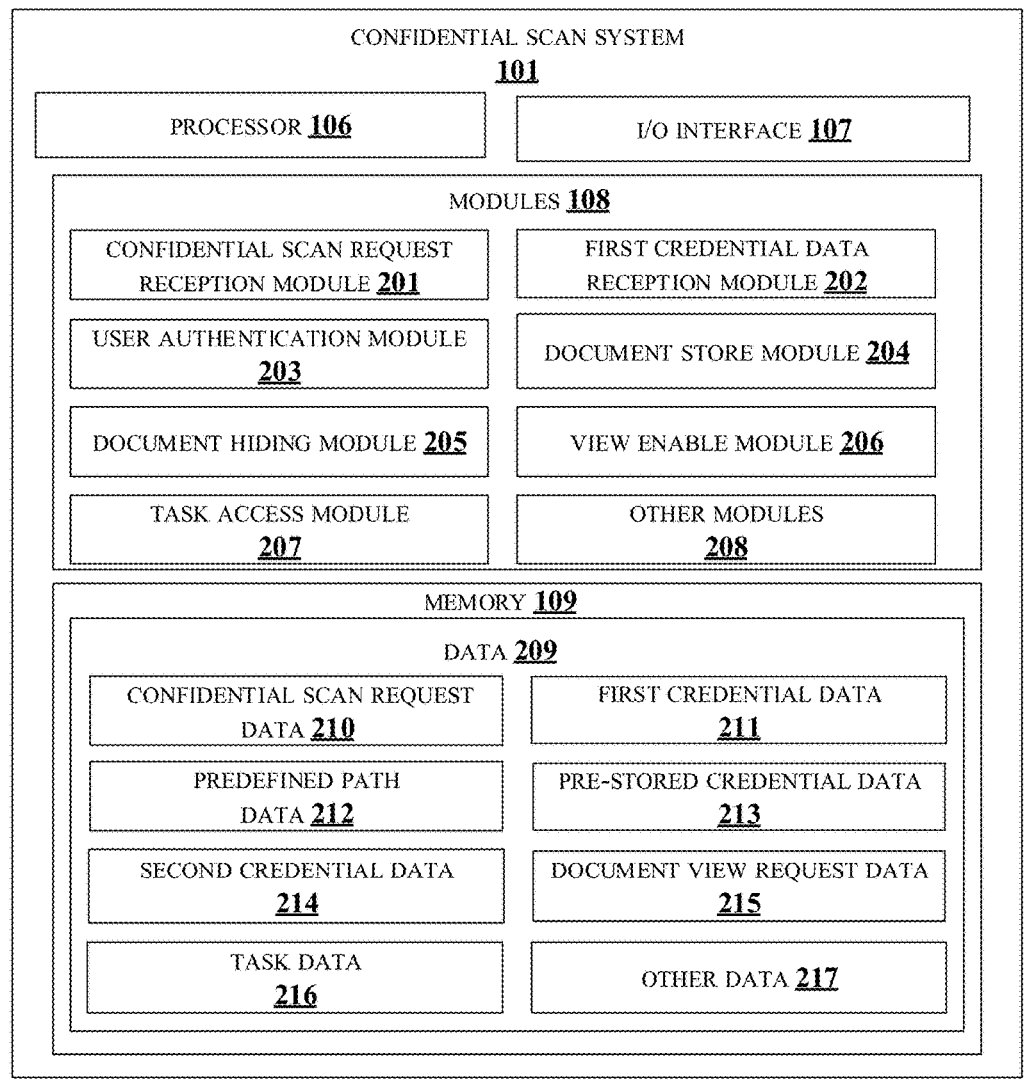
FIG. 2 shows a detailed block diagram of a confidential scan system for performing confidential scanning of a document in accordance with some embodiments of the present disclosure.

FIG. 2 shows a detailed block diagram of the confidential scan system 101 for performing the confidential scan of the document in accordance with some embodiments of the present disclosure.

The data 209 in the memory 109 and the one or more modules 108 of the confidential scan system 101 may be described herein in detail.

In one implementation, the one or more modules 108 may include, but are not limited to, a confidential scan request reception module 201, a first credential data reception module 202, user authentication module 203, a document store module 204, a document hiding module 205, a view enable module 206, task access module 207 and one or more other modules 208 associated with the confidential scan system 101.

In at least one embodiment, the data 209 in the memory 109 may comprise confidential scan request data 210 (also referred as request for confidential scan 210), first credential data 211, predefined path data 212 (also referred as predefined path 212), pre-stored credential data 213, second credential data 214, document view request data 215 (also referred as request for view 215), task data 216 (also referred as one or more tasks 216) and other data 217 associated with the confidential scan system 101.

In at least one embodiment, the data 209 in the memory 109 may be processed by the one or more modules 108 of the confidential scan system 101. As used herein, the term module may refer to an application specific integrated circuit (ASIC), an electronic circuit, a field-programmable gate arrays (FPGA), Programmable System-on-Chip (PSoC), a combinational logic circuit, and/or other suitable components that provide the described functionality.

Figure 6A:
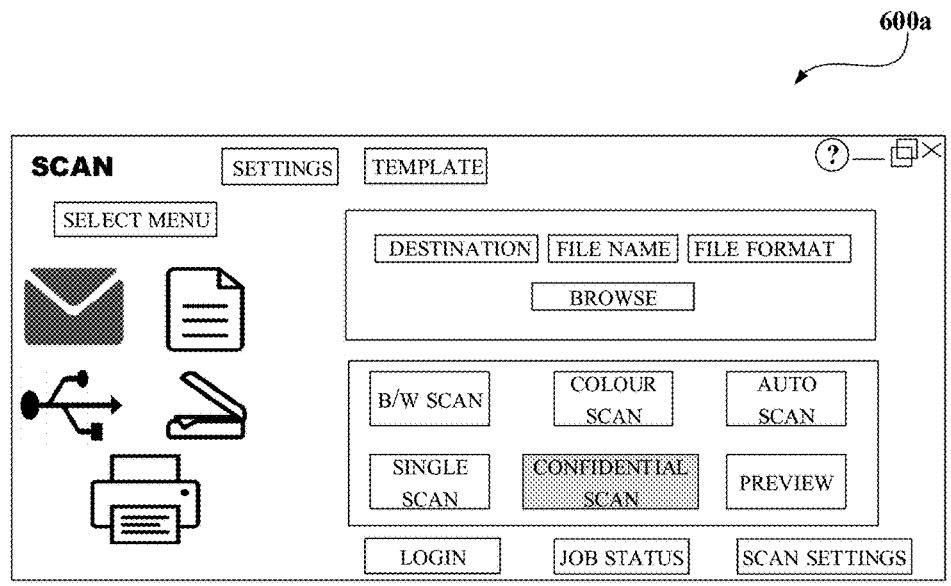

For performing the confidential scan on the document, initially, the request for confidential scan of a document may be received by the confidential scan request reception module 210. The request for the confidential scan may be through the scanner device 102. The scanner device 102 may provision an option to the user 110 to choose between a normal scan and the confidential scan. An exemplary representation of a display 600*a* associated with the scanner device for receiving the request for confidential scan 210 may be as shown in FIG. 6*a*. The display 600*a* on the scanner device 102 may provision one or more icons for each of one or more operations. Using the one or more icons, the user 110 may be provisioned to select a desired operation from the one or more operations. As shown in the figure, an icon "CONFIDENTIAL SCAN" may be selected by the user 110 to perform the confidential scan of the document. By selecting the icon "CONFIDENTIAL SCAN", the request for confidential scan 210 may be generated by the scanner device 102 and provided to the confidential scan system 101.

Figure 6B:
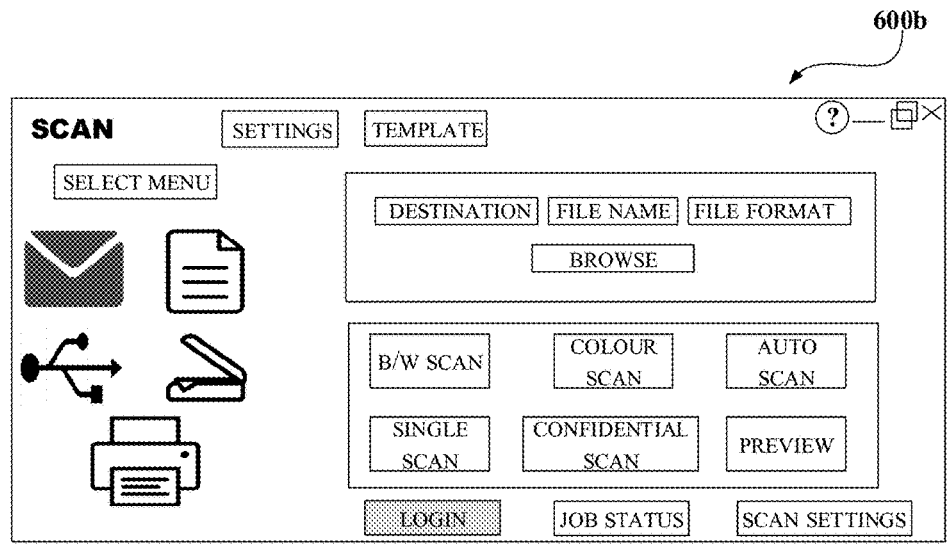
Figure 6C:
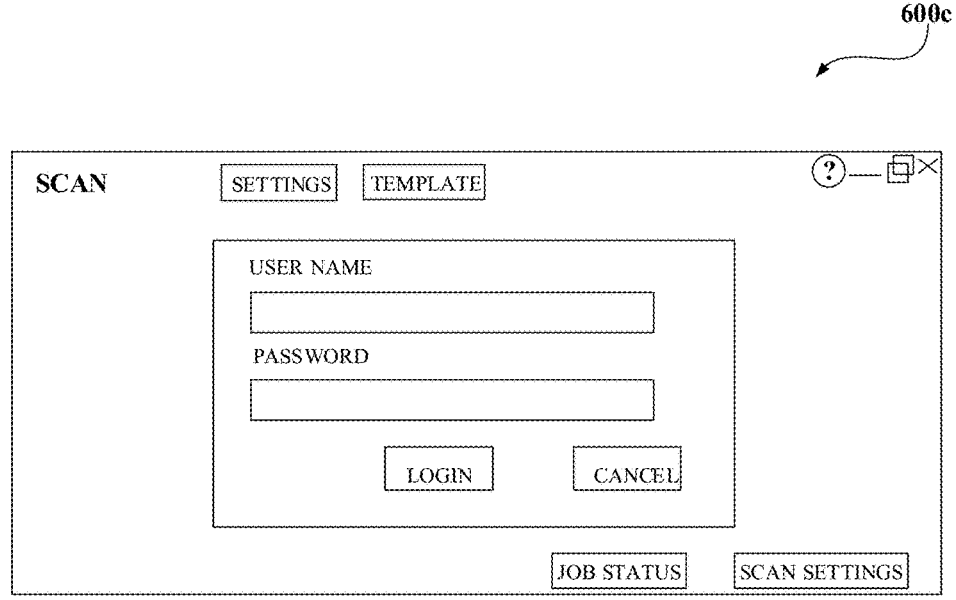

Upon receiving the request for the confidential scan 210 by the confidential scan request reception module 201, the first credential data reception module 202 may receive the first credential data 211 from the user 110. The user 110 may be enabled to provide the first credential data 211 through the scanner device 102. An exemplary representation of a display 600*c* of the scanner device 102 for the enabling may be as shown in FIG. 6*c*. In at least one embodiment, the user 110 may provide user name and a password as the first credential data 211. Upon providing the first credential data 211, the user 110 may select an icon "LOGIN" to send the first credential data 211 to the confidential scan system 101. One or more other techniques known to a person skilled in the art may be implemented for the user authentication. In at least one embodiment, the first credential data 211 may be retrieved from a smart card associated with the user 110 for the user authentication. The first credential data reception module 202 may be configured to receive the first credential data 211 from the smart card via one or more communication means. The communication means may be implemented using techniques, including, but not limited to, near-field communication technology, barcode technology, magnetic stripe technology, Wiegand card technology, radio-based technology and so on. In at least one embodiment, the user authentication may be performed using biometrics, where the first credential data 211 may be one or more biometric parameters associated with the user 110. The biometric parameters may include, but are not limited to, finger print, palm print, face recognition, voice, iris scan, retina scan and so on. In at least one embodiment, the first credential data 211 may be retrieved by the first credential data reception module 202 via the communication network 105.

Upon receiving the first credential data 211, the user 110 may be authenticated by the user authentication module 203 based on the first credential data 211. For the authentication, the first credential data 211 may be verified to be one of the pre-stored credential data 213 in the credential data repository 104 by the user authentication module 203. If the first credential data 211 is verified to be the pre-stored credential data 213, the confidential scan system 101 completes the authentication of the user 110. If the first credential data 211 is not the pre-stored credential data 213, the user authentication module 203 verifies the first credential data 211 to be the new credential data. Further, when the first credential data 211 is verified to be the new credential data, the first credential data 211 may be updated in the credential data repository 104 as one of the pre-stored credential data 213 by the user authentication module 203 to complete the authentication.

Upon the authentication and scanning of the document, the confidential scanned document may be stored in the predefined path 212 as the hidden document, by the document store module 204. The document store module 204 may enable the user 110 to provide the predefined path 212 via the scanner device 102. The user 110 may select an icon "BROWSE" as shown in the display 600a of FIG. 6a for providing the predefined path 212. The scanner device 102 may retrieve the predefined path 212 and provide the predefined path 212 to the confidential scan system 101 via the communication network 105. In at least one embodiment, the document store module 204 may consider the predefined path 212 to be the path to the common document repository 103 associated with the scanner device 102, when the path is not provided by the user 110. By provisioning the storage of the confidential scanned document in the predefined path 212, the confidential scanned document may be stored in storage space where non-confidential scanned documents may also be stored. Also, the confidential scanned document may be stored in any storage space as desired by the user 110. The need for restriction on storage space for the confidential scanned document may be eliminated.

In at least one embodiment, the confidential scanned document may be stored as hidden document by the document hiding module 205. One or more techniques, known to a person skilled in the art, may be implemented for hiding the confidential scanned document. By storing the confidential scanned document as the hidden document, the access to the confidential scanned document may be disabled to a user who may not be authenticated.

Figure 6D:
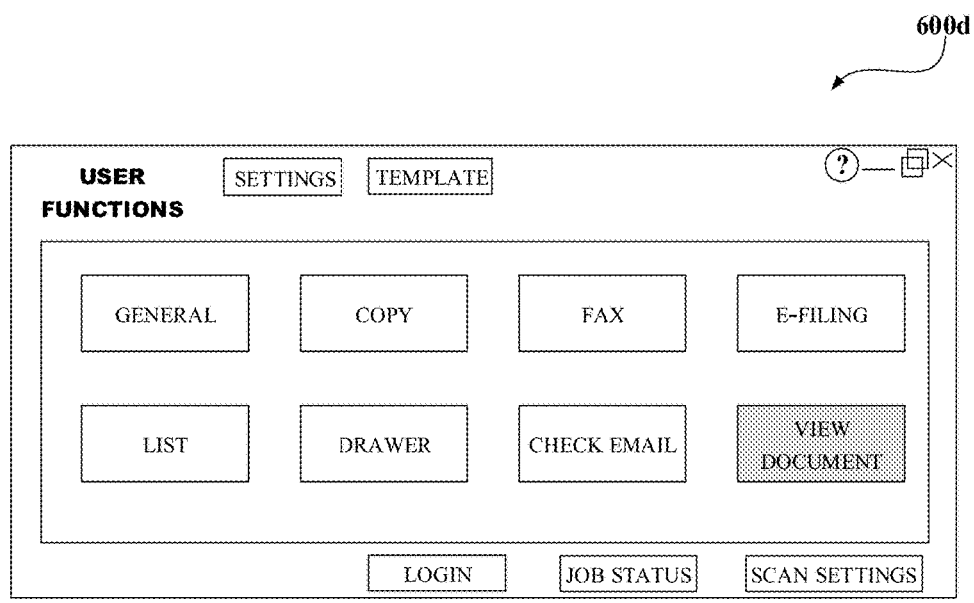

In at least one embodiment, the view enable module 206 of the confidential scan system 101 may be configured to enable the user 110 to view the confidential scanned document. For enabling, the view enable module 206 receives the second credential data 214 from the user 110 via the scanner device 102. The user 110 may be provisioned to enter the second credential data 214 by selecting an icon "LOGIN" as illustrated in a display 600b of FIG. 6b. By selecting the icon "LOGIN", the user 110 may be directed to the display 600c in the scanner device 102, which enables the user 110 to input the second credential data 214. Upon inputting the second credential data 214, the user 110 may select an icon "LOGIN" in the display 600c to provide the second credential data 214 to the confidential scan system 101. The view enable module 206 may retrieve the second credential data 214 from the scanner device 102 via the communication system 105. The second credential data 214 may be same as the first credential data 211. Upon login of the user 110, the user 110 may be directed to a display 600d of FIG. 6d in the scanner device 102.

The request to view the confidential scanned document may be received by the view enable module 206. The user 110 may be provided an option to send the request to view 215 the confidential scanned document through the scanner device 102. The request to view 215 may be provide by selecting an icon "VIEW DOCUMENTS" in the display 600d. The scanner device 102 may provide the request to view to the confidential scan system 101 via the communication network 105. Upon receiving the request to view 215 by the view enable module 206, the second credential data 214 may be verified to be same as the first credential data 211. When the second credential data 214 is verified to be the first credential data 211, the view enable module 206 enables the user 110 to view the confidential scanned document associated with the first credential data 211. The user 110 may be provided with one or more documents which are stored upon authentication using the first credential data 211. Exemplary representation of a display 600e in FIG. 6e may be shown on the scanner device 102. As shown in the figure, list of the one or more documents may be displayed.

In at least one embodiment, the task access module 207 may be configured to provide an access to the user 110 to perform the one or more tasks 216 on the confidential scanned document. In the display 600e, when the user 110 selects a document and further selects an icon "SELECT", the user 110 may be directed to display 600f of FIG. 6f in the scanner device 102. For example, consider DOC021017 and DOC031487 are the one or more documents listed in the display 600e. When the user 110 selects DOC031487 and selected the icon "SELECT", the user 110 may be directed to the display 600f. In the display 600f, the user 110 may be provisioned to perform the one or more tasks 216 on the document DOC03148. As shown in the display 600f, the one or more tasks 216 may include opening, copying, deleting, printing, editing, colour printing, publishing, viewing document.

The task of opening may be performed by selecting an icon "OPEN" in the display 660f. The task of copying may be performed by selecting an icon "COPY" in the display 660f. The task of deleting may be performed by selecting an icon "DELETE" in the display 660f. The task of printing may be performed by selecting an icon "PRINT" in the display 660f. The task of editing may be performed by selecting an icon "EDIT" in the display 660f. The task of colour printing may be performed by selecting an icon "COLOUR PRINT" in the display 660f. The task of viewing document may be performed by selecting an icon "VIEW DOCUMENT" in the display 660f. The task of cutting and pasting the confidential scanned document may be performed by selecting an icon "CUT AND PASTE" in the display 660f. In at least one embodiment, by selecting the icon "CUT AND PASTE", the user 110 may be provisioned to delete the confidential scanned document in the common document repository and store the confidential scanned document in storage space of a user device associated with the user 110. The task of publishing may be performed by selecting an icon "PUBLISH" in the display 660f. In at least one embodiment, access to publish may provision the user 110 to disable the hiding of the confidential scanned document in the predefined path 212. By publishing the confidential scanned document, the confidentiality of the confidential scanned document may be lost, and the document may be accessible and viewed by any user associated with the scanner device 102.

In at least one embodiment, the confidential scan system 101 may receive data for performing the confidential scan through the I/O interface 107 of the confidential scan system 101. Also, the confidential scan system 101 may transmit data for the confidential scan via the I/O interface 107. The 1/O interface 107 may be coupled with the processor 106 of the confidential scan system 101.

The other data 217 may store data, including temporary data and temporary files, generated by modules for performing the various functions of the confidential scan system 101. The one or more modules 208 may also include other modules 208 to perform various miscellaneous functionalities of the confidential scan system 101. It will be appreciated that such modules may be represented as a single module or a combination of different modules.

Figure 3:
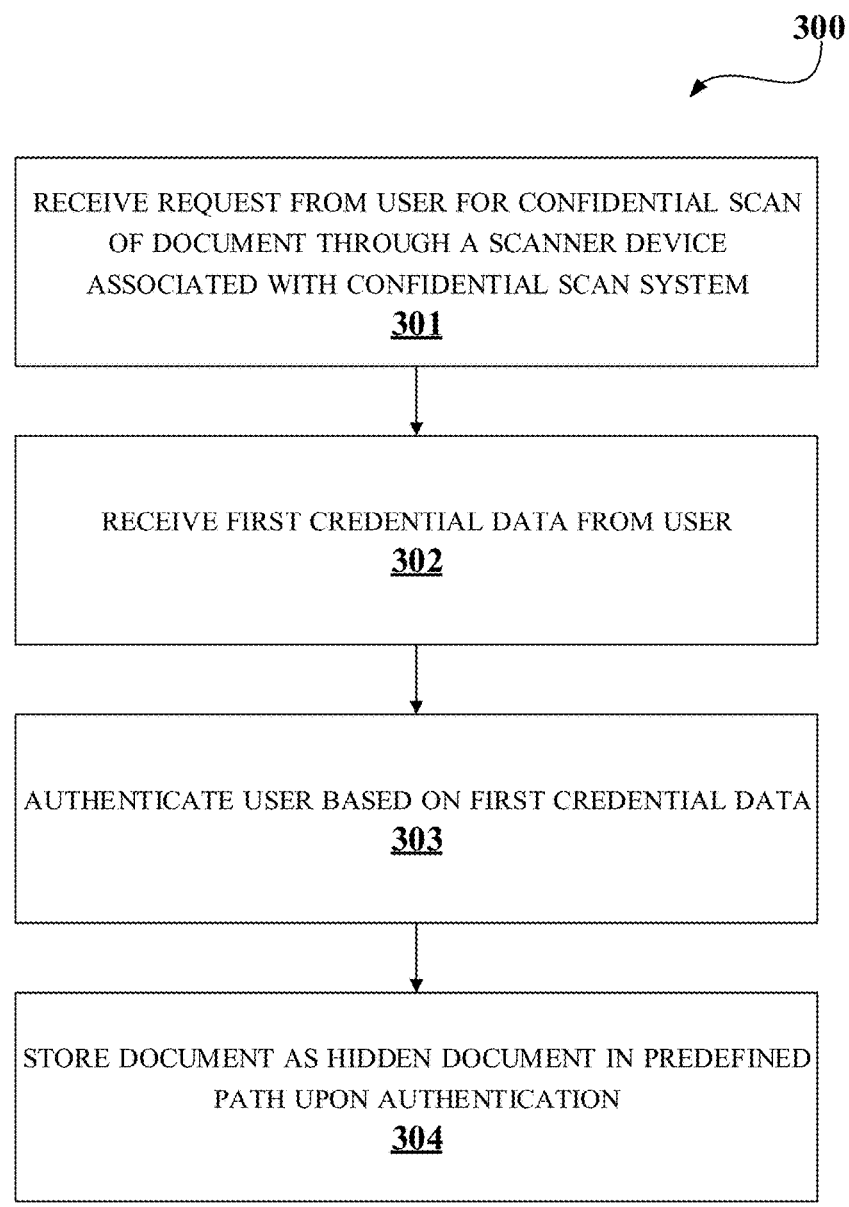
FIG. 3 illustrates a flowchart showing an exemplary method for performing confidential scanning of a document with some embodiments of present disclosure.

FIG. 3 illustrates a flowchart showing an exemplary method 300 for performing the confidential scan of the document with some embodiments of present disclosure.

At block 301, the confidential scan request reception module 201 of the confidential scan system 101 may receive the request for confidential scan 210 from the user 110 for the confidential scan of the document through the scanner device 102 associated with the confidential scan system 101. In at least one embodiment, an option for sending said request 219 for the confidential scan may be provided by the user 110 through the scanner device 102.

At block 302, the first credential data reception module 202 of the confidential scan system 101 may receive the first credential data 211 from the user 110. In at least one embodiment, the first credential data 211 may be provided by the user 110 through the scanner device 102. In at least one embodiment, the first credential data 211 may comprise at least one of the user identification data and the password.

Figure 4:
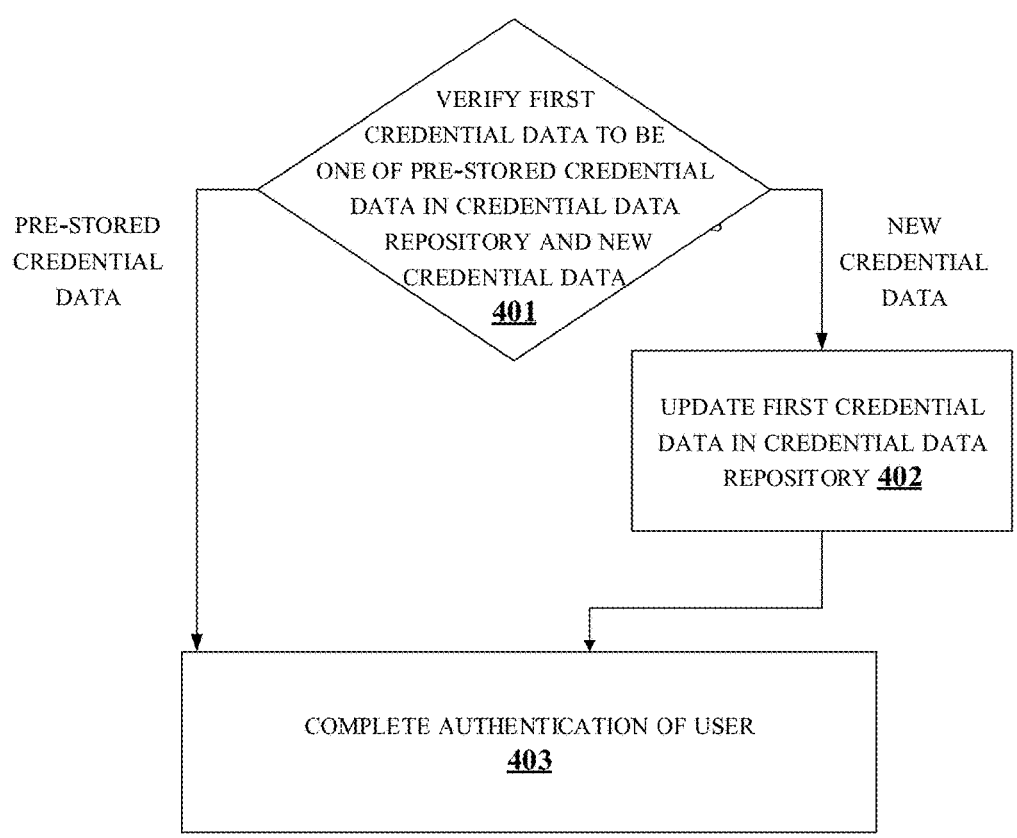
FIG. 4 illustrates a flowchart showing an exemplary method for authenticating a user in accordance with some embodiments of present disclosure.

At block 303, the user authentication module 203 of the confidential scan system 101 authenticates the user 110 based on the first credential data 211. An exemplary method 400 for authenticating the user 110 is illustrated in FIG. 4.

At block 401, the user authentication module 203 verifies the first credential data 211 to be one of the pre-stored credential data 213 and the new credential data. The pre-stored credential data 213 may be retrieved from the credential data repository 104 associated with the confidential scan system 101. For the verification, the user authentication module 203 checks for the first credential data 211 to be one of the pre-stored credential data 213. When the first credential data 211 is not one of the pre-stored credential data 213, the user authentication module 203 verifies the first credential data 211 to be the new credential data and step in block 402 may be performed. When the first credential data 211 is one of the pre-stored credential data 213, step in block 403 may be performed.

At block 402, when the user authentication module 203 verifies the first credential data 211 to be the new credential data, the first credential data 211 is updated in the credential data repository 104 as one of the pre-stored credential data 213. Upon updating, step in block 403 may be performed.

At block 403, when the user authentication module 203 performs one of verifying the first credential data 211 to be the pre-stored credential data 213 and updating the first credential data 211 in the credential data repository 104, the user authentication module 203 complete the authentication of the user 110 for the confidential scan.

Referring to FIG. 3, at block 304, the document store module 204 of the confidential scan system 101, stores the confidential scanned document as the hidden document in the predefined path 212 upon the authentication. The predefined path 212 may be one of the path to the common document repository 103 and the path provided by the user 110. One or more techniques, known to a person skilled in the art may be implemented for storing the confidential scanned document as the hidden document.

Figure 5:
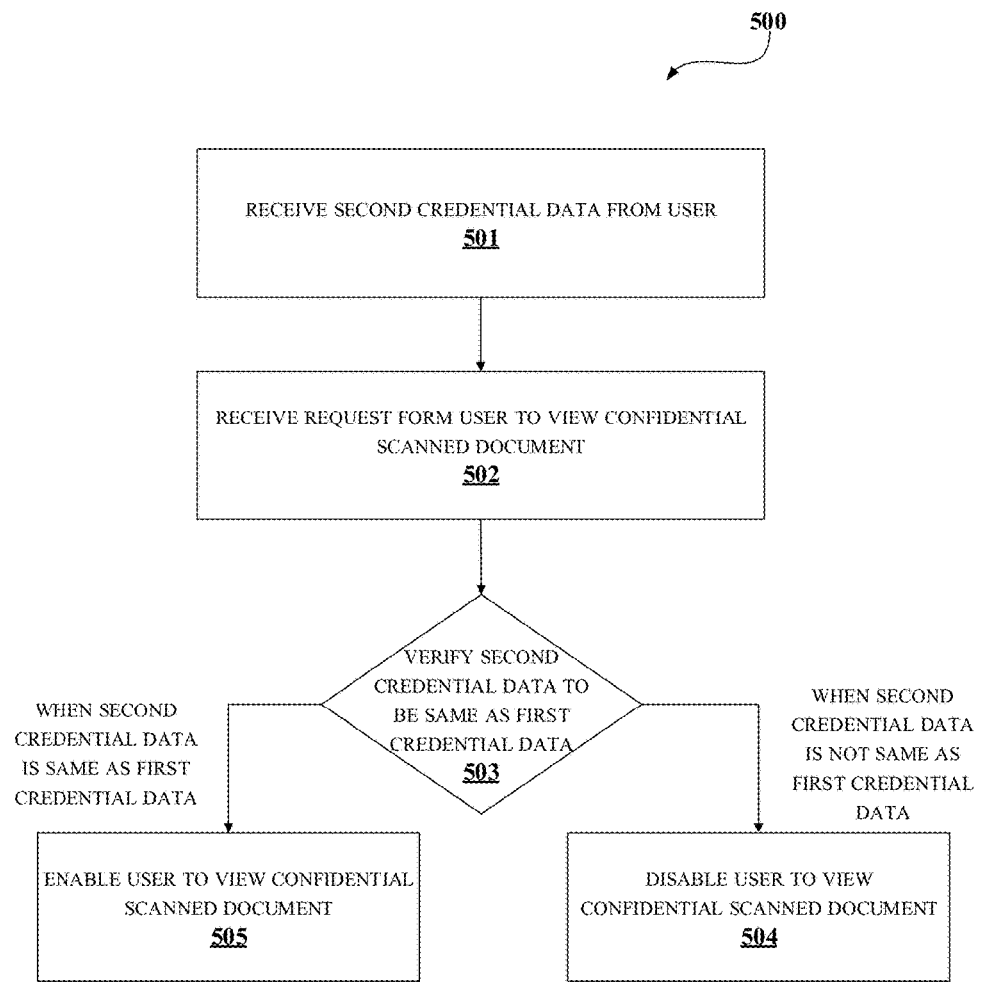
FIG. 5 illustrates a flowchart showing an exemplary method for enabling a user to view confidential scanned document with some embodiments of present disclosure.

FIG. 5 illustrates a flowchart showing an exemplary method 500 for enabling the user 110 to view the confidential scanned document with some embodiments of present disclosure.

At block 501, the view enable module 206 of the confidential scan system 101, receives the second credential data 214 from the user 110. In at least one embodiment, the second credential data 214 may be provided by the user 110 in the scanner device 102. In at least one embodiment, the first credential data 211 may comprise at least one of the user identification data and the password.

At block 502, the view enable module 206 receives the request to view 215 from the user 110 for viewing the confidential scanned document. In at least one embodiment, an option for sending the request to view 215 may be provided by the user 110 through the scanner device 102.

At block 503, the view enable module 206 verifies the second credential data 214 to be same as the first credential data 211 upon receiving the request to view 215. The view enable module 206 performs step at block 505 when the second credential data 214 is same as the first credential data 211. The view enable module 206 performs step at block 504 when the second credential data 214 is not same as the first credential data 211.

At block 504, when the second credential data 214 is same as the first credential data 211, the view enable module 206 enables the user 110 to view the confidential scanned document. Upon the enabling the view, the user 110 may be able to perform the one or more tasks 216 on the confidential scanned document.

At block 505, when the second credential data 214 is not same as the first credential data 211, the view enable module 206 disables the user 110 to view the confidential scanned document. Upon the disabling the view, the user 110 may not be able to perform the one or more tasks 216 on the confidential scanned document.

As illustrated in FIGS. 3, 4 and 5, the methods 300, 400 and 500 may include one or more blocks for executing processes in the confidential scan system 101. The methods 300, 400 and 500 may be described in the general context of computer executable instructions. Generally, computer executable instructions can include routines, programs, objects, components, data structures, procedures, modules, and functions, which perform particular functions or implement particular abstract data types.

The order in which the methods 300, 400 and 500 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Figure 7:
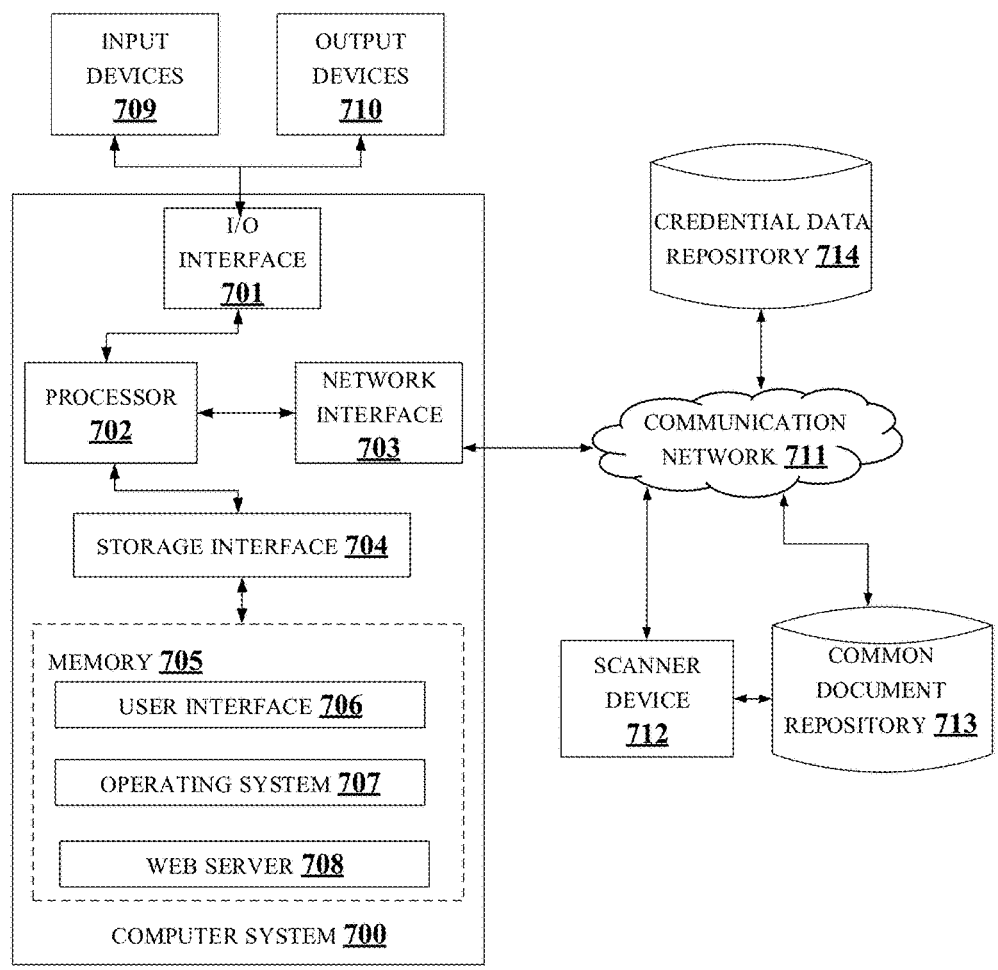
FIG. 7 illustrates a block diagram of an exemplary computer system for implementing some embodiments of the present disclosure.

FIG. 7 illustrates a block diagram of an exemplary computer system 700 for implementing embodiments consistent with the present disclosure. In at least one embodiment, the computer system 700 is used to implement the confidential scan system 101. The computer system 700 may include a central processing unit ("CPU" or "processor") 702. The processor 702 may include at least one data processor for executing processes in a Virtual Storage Area Network. The processor 702 may include specialized processing units such as, integrated system (bus) controllers, memory management control units, floating point units, graphics processing units, digital signal processing units, etc.

The processor 702 may be disposed in communication with one or more input/output (I/O) devices 709 and 710 via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices 709 and 710. For example, the input devices 709 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 710 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 may consist of the marking monitoring system 101. The processor 702 may be disposed in communication with the communication network 711 via a network interface 703. The network interface 703 may communicate with the communication network 711. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 711 may include, without limitation, a direct interconnection, local area network (LAN), wide area network (WAN), wireless network (e.g., using Wireless Application Protocol), the Internet, etc. Using the network interface 703 and the communication network 711, the computer system 700 may communicate with a scanner device 712, a common document repository 713 and the credential data repository 714 for performing the confidential scan. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 711 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707 etc. In some embodiments, computer system 700 may store user/application data 706, such as the data, variables, records, etc., as described in this disclosure. Such databases may be implemented as fault-tolerant, relational, scalable, secure databases such as Oracle® or Sybase®.

The operating system 707 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., that are non-transitory. Examples include Random Access Memory (RAM). Read-Only Memory (ROM), volatile memory, non-volatile memory, hard drives, CD ROMs, DVDs, flash drives, disks, and any other physical storage media.

At least one embodiment of the present disclosure provisions a method and system for confidential scan of a document using user specific credential data. By this, only the confidential scanner documents associated with the user may be provided to the user upon receiving the user specific credential data.

At least one embodiment of the present disclosure provisions to store confidential scanned document in a common document repository eliminating the need for user specific storage areas.

At least one embodiment of the present disclosure, confidential scanned document may be viewed provided the user who is authenticated only. By this, feature of making the confidential scanned document invisible to other users may be achieved.

At least one embodiment of the present disclosure, along with provisioning confidentially in scanned documents, the user may be provision to store confidential scanned document in any desired location. By this, restriction on the storage space for the confidential scanned document may be eliminated. Also, efficient usage of the storage space associated with a scanner device may be achieved. At least one embodiment of the present disclosure enables only the authenticated users to perform one or more tasks on confidential scanned document.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs. ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "at least one embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of at least one embodiment with several components in communication with each other does not imply that all such components are required. On the contrary a variety of optional components are described to illustrate the wide variety of possible embodiments.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

The illustrated operations of FIGS. 3, 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for confidential scanning of a document in a scanner device, comprising:
    receiving, by a confidential scan system, a request from a user for a confidential scan of a document through a scanner associated with the confidential scan system;
    receiving, by the confidential scan system, first credential data from the user;
    authenticating, by the confidential scan system, the user based on the first credential data;
    storing, by the confidential scan system, the document as a hidden document which is a confidential scanned document in a predefined path, upon the authentication;
    permitting the user to view the confidential scanned document by:
        (i) receiving, by the confidential scan system, second credential data from the user;
        (ii) receiving, by the confidential scan system, a request from the user to view the confidential scanned document;
        (iii) verifying, by the confidential scan system, the second credential data to be the same as the first credential data upon receiving the request; and
        (iv) enabling, by the confidential scan system, the user to view the confidential scanned document upon verification when the confidential scanned document is retrieved from the predefined path for viewing; and
    providing, by the confidential scan system, access to the user to perform one or more tasks relating to the confidential scanned document upon the verification, wherein the one or more tasks relating to the confidential scanned document include at least one of modifying, deleting, printing, copying, cutting, pasting, or publishing the confidential scanned document,
    wherein the publishing of the confidential scanned document comprises disabling hiding of the confidential scanned document in the predefined path.

2. The method as claimed in claim 1, wherein authenticating the user comprises:

verifying, by the confidential scan system, the first credential data to be one of pre-stored credential data in a credential data repository associated with the scanner or new credential data.

3. The method as claimed in claim 2, further comprising updating the first credential data in the credential data repository, when the first credential data is verified to be the new credential data.

4. The method as claimed in claim 1, wherein the predefined path is one of a path to a common document repository associated with the scanner or a path provided by the user.

5. A confidential scan system for confidential scanning of a document in a scanner, comprising:
 a processor; and
 a memory communicatively coupled to the processor, wherein the memory is configured to store processor-executable instructions, which, on execution, cause the processor to:
  receive a request from a user for a confidential scan of a document through a scanner associated with the confidential scan system;
  receive first credential data from the user;
  authenticate the user based on the first credential data;
  store the document as a hidden document which is a confidential scanned document in a predefined path upon the authentication;
  perform operations so as to permit the user to view the confidential scanned document, the operations comprising:
   (i) receiving second credential data from the user;
   (ii) receiving a request from the user to view the confidential scanned document;
   (iii) verifying the second credential data to be the same as the first credential data upon receiving the request; and
   (iv) enabling the user to view the confidential scanned document upon verification, wherein the confidential scanned document is retrieved from the predefined path for viewing; and
  provide access to the user to perform one or more tasks relating to the confidential scanned document upon verification,
  wherein the one or more tasks include modifying, deleting, printing, copying, cutting, pasting, or publishing the confidential scanned document, and
  wherein the publishing of the confidential scanned document comprises disabling hiding of the confidential scanned document in the predefined path.

6. The confidential scan system as claimed in claim 5, wherein the user is authenticated by verifying the first credential data to be one of pre-stored credential data in a credential data repository associated with the scanner or new credential data.

7. The confidential scan system as claimed in claim 6, wherein the first credential data is updated in the credential data repository, when the first credential data is verified to be the new credential data.

8. The confidential scan system as claimed in claim 5, wherein the predefined path is one of a path to a common document repository associated with the scanner or a path provided by the user.

9. An apparatus for confidential scanning of a document, comprising:
 a scanner; and
 at least one computer configured to communicate with the scanner, the at least one computer being configured to:
  receive a request from a user for a confidential scan of a document through the scanner;
  receive first credential data from the user;
  authenticate the user based on the first credential data;
  store the document as a hidden document which is a confidential scanned document in a predefined path upon the authentication;
  permit the user to view the confidential scanned document by performing operations comprising:
   (i) receiving a second credential data from the user;
   (ii) receiving a request from the user to view the confidential scanned document;
   (iii) verifying the second credential data to be the same as the first credential data upon receiving the request; and
   (iv) enabling the user to view the confidential scanned document upon verification when the confidential scanned document is retrieved from the predefined path for viewing; and
  provide access to the user to perform one or more tasks relating to the confidential scanned document upon verification,
  wherein the one or more tasks include modifying, deleting, printing, copying, cutting, pasting, or publishing the confidential scanned document, and
  wherein the publishing of the confidential scanned document comprises disabling hiding of the confidential scanned document in the predefined path.

10. The apparatus as claimed in claim 9, wherein the at least one computer is configured to authenticate the user by verifying the first credential data to be one of pre-stored credential data in a credential data repository associated with the scanner or new credential data.

11. The apparatus as claimed in claim 10, wherein the at least one computer is configured to update the first credential data in the credential data repository, when the first credential data is verified to be the new credential data.

12. The apparatus as claimed in claim 9, wherein the predefined path is one of a path to a common document repository associated with the scanner or a path provided by the user.

13. The method as claimed in claim 1, wherein storing the document as the hidden document comprises storing the document in a same storage location as at least one non-confidential scanned document.

14. The confidential scan system as claimed in claim 5, wherein the instructions further include instructions to store the hidden document in a same storage location as at least one non-confidential scanned document.

15. The apparatus as claimed in claim 9, wherein the at least one computer is configured to store the hidden document in a same storage location as at least one non-confidential scanned document.

16. The method as claimed in claim 1, further comprising preventing viewing of the confidential scanned document by the user when the second credential data is not the same as the first confidential data.

17. The confidential scan system as claimed in claim 5, wherein the instructions further comprise instructions to prevent viewing of the confidential scanned document by the user when the second credential data is not the same as the first confidential data.

18. The apparatus as claimed in claim 9, wherein the at least one computer is further configured to prevent viewing of the confidential scanned document by the user when the second credential data is not the same as the first confidential data.

19. The method as claimed in claim 4, wherein storing the document as the hidden document comprises storing the document in the common repository, the common repository being accessible to multiple users and being configured to store at least one non-confidential document in addition to the hidden document.

20. The confidential scan system as claimed in claim 8, wherein the instructions to store the document as a hidden document comprise storing the document in the common repository, the common repository being accessible to multiple users and being configured to store at least one non-confidential document in addition to the hidden document.

* * * * *